July 12, 1966 M. B. PACKER 3,260,556
LIQUID PRESSURE BRAKING SYSTEMS FOR VEHICLES
Filed May 31, 1963 5 Sheets-Sheet 1
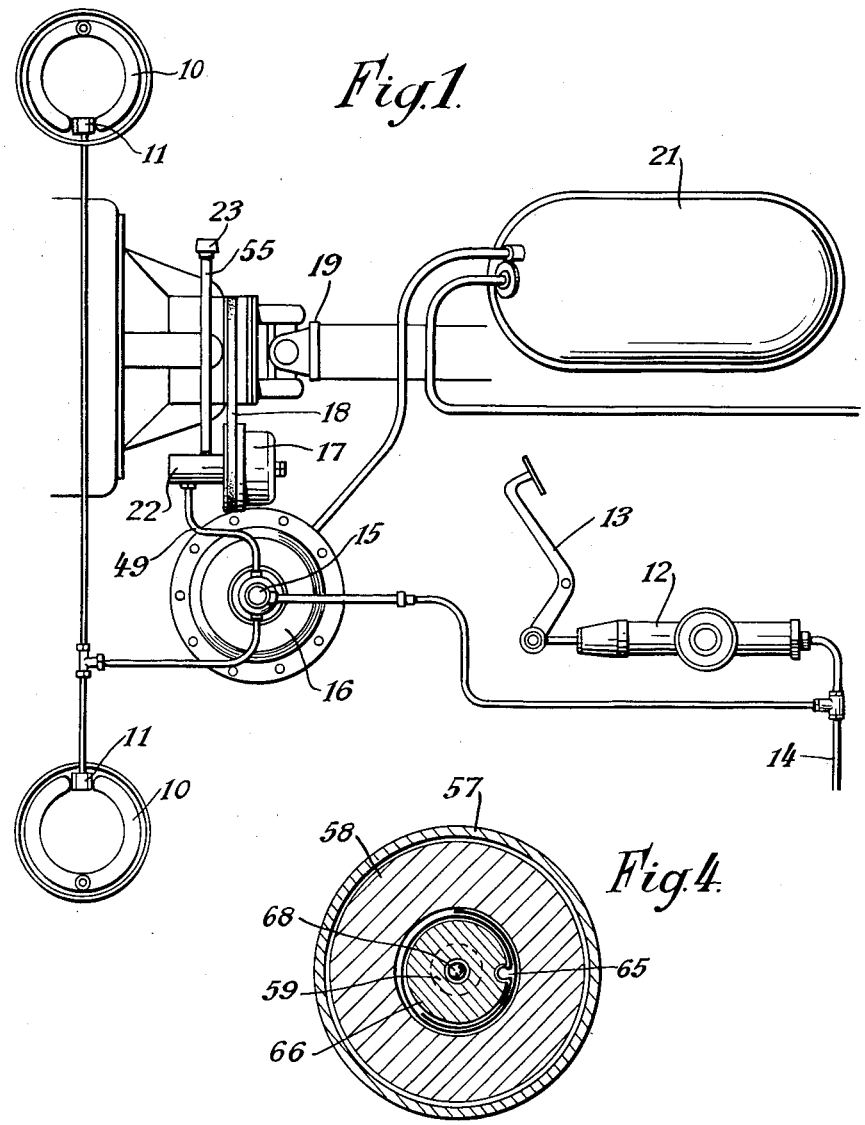
INVENTOR
Mervyn B. Packer
BY
Lawrence J. Winter
ATTORNEY

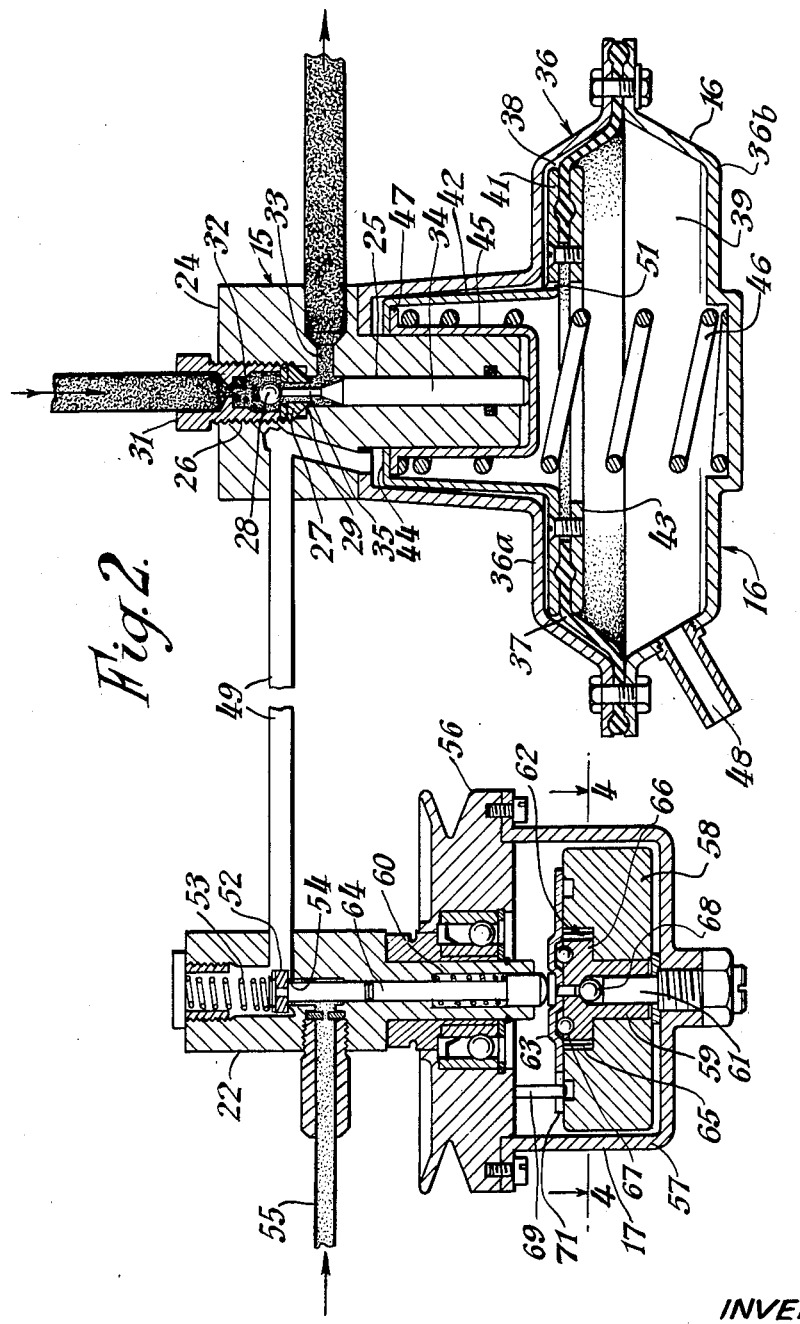

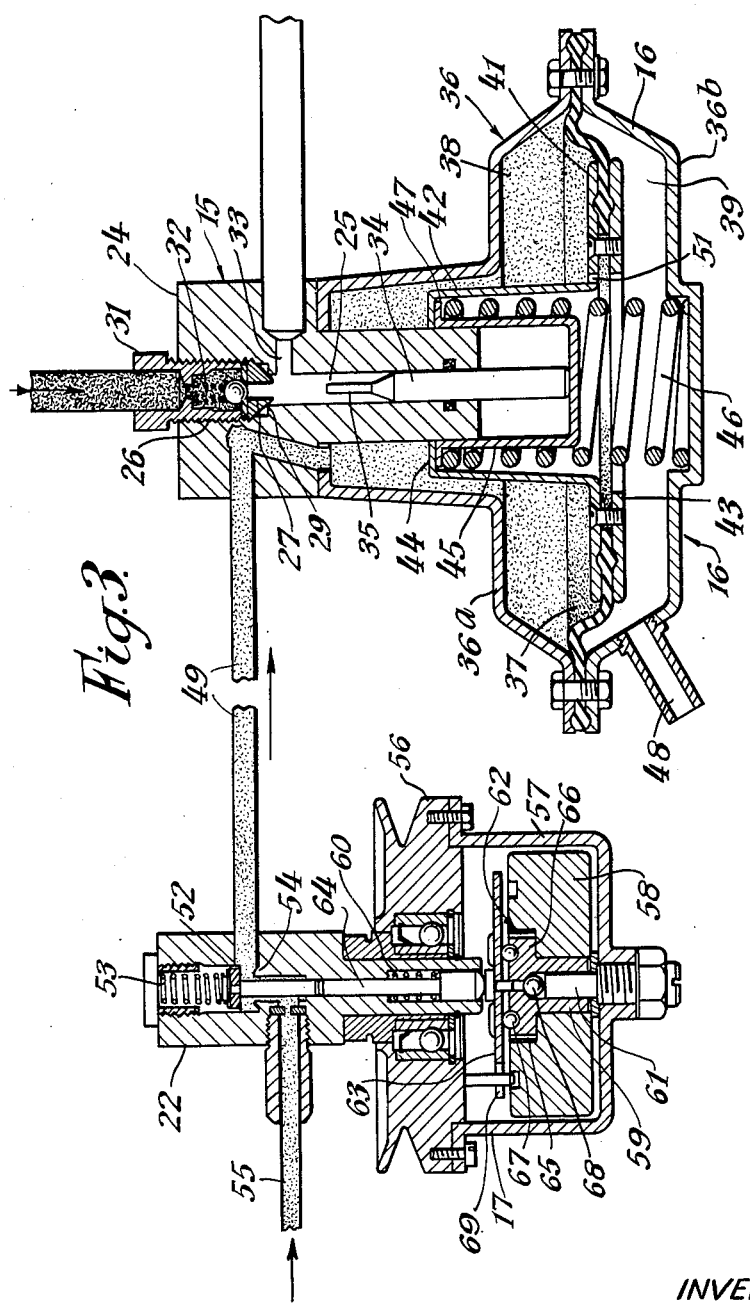

July 12, 1966 M. B. PACKER 3,260,556
LIQUID PRESSURE BRAKING SYSTEMS FOR VEHICLES
Filed May 31, 1963 5 Sheets-Sheet 4
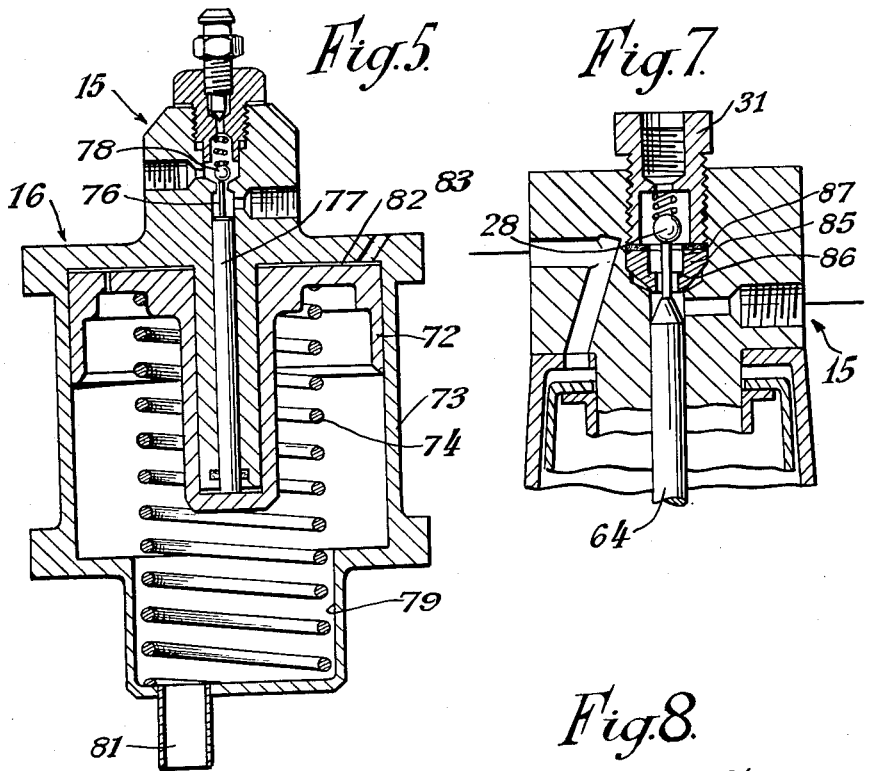
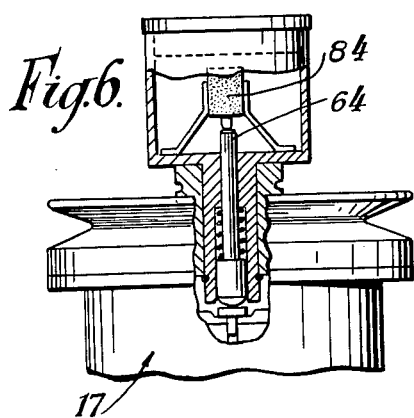
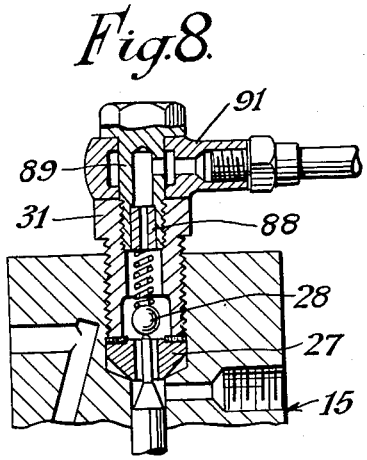
INVENTOR
Mervyn B. Packer
BY Lawrence J. Winter
ATTORNEY

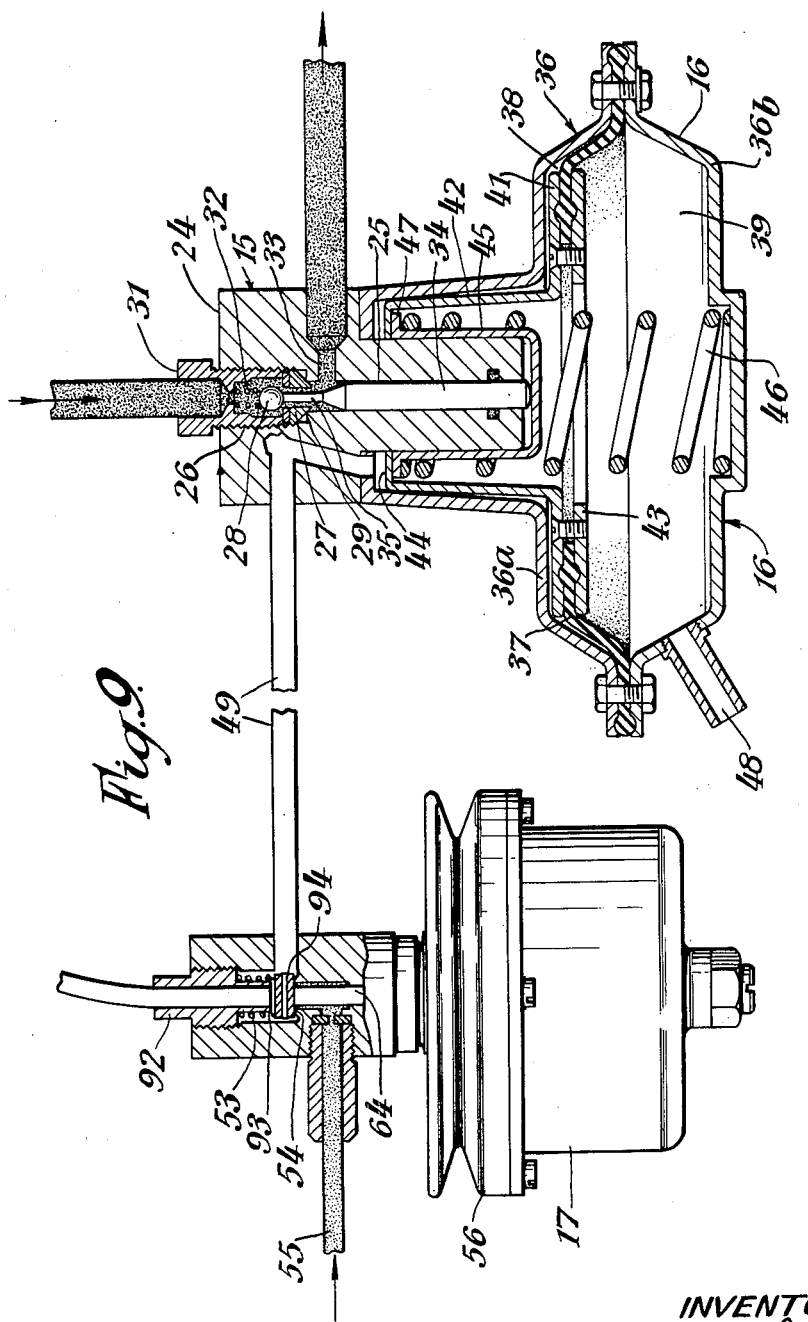

United States Patent Office 3,260,556
Patented July 12, 1966

3,260,556
LIQUID PRESSURE BRAKING SYSTEMS FOR VEHICLES
Mervyn B. Packer, Leamington Spa, England, assignor to Automotive Products Company Limited, Leamington Spa, England
Filed May 31, 1963, Ser. No. 284,443
Claims priority, application Great Britain, June 15, 1962, 23,196/62, 23,199/62
3 Claims. (Cl. 303—21)

This invention relates to liquid pressure braking systems for vehicles of the kind in which means are provided to reduce automatically the liquid pressure exerted to apply the brake or brakes acting to resist rotation of a wheel or wheels of the vehicle as a result of a tendency of the said wheel or wheels to skid or to approach conditions in which skidding would commence, so that the braking can be relieved to prevent wheel locking and resultant sliding of the vehicle.

In braking systems of the kind referred to, it has been proposed to provide a valve, normally held open, and acting when closed as a non-return valve preventing flow of liquid from the master cylinder or other pressure source of the system to the motor cylinders actuating the brakes for resisting the rotation of the wheels of which the braking is to be controlled to prevent locking, the valve closing in response to the actuation of a servo-device. The actuation of the servo-device also relieves a load on a plunger so that it can move to increase the volume of the liquid space between the valve and the motor cylinders so as to reduce the liquid pressure therein.

It is one object of the present invention to provide improved means for controlling the liquid pressure in response to the operation of a sensing device which may respond directly to deceleration of wheel rotation, to deflection of wheel mountings under braking loads, or to other changes in conditions resulting from braking.

It will be apparent that if, after the valve has closed, the pressure produced by the pressure source is increased, there will be a pressure differential across the valve when it is opened. If this differential is large, the brakes will be re-applied very rapidly, causing the device which senses the rate of deceleration to again operate and reduce the braking, the fluctuations of braking causing discomfort to the occupants of the vehicle and increasing the distance travelled by the vehicle before it is stopped by the brakes.

It is another object of the present invention to obviate this disadvantage.

According to the present invention, in a liquid pressure braking system comprising a master cylinder or other pressure source and at least one motor cylinder actuating a brake on a wheel of a vehicle, a non-return valve closable to prevent liquid flowing from the said pressure source to the motor cylinder and means to vary the capacity of the part of the system between the non-return valve and the motor cylinder, and a sensing device operable in response to a change of conditions tending to produce wheel locking to cause the closing of the non-return valve and the increase of the capacity of the said part of the system. The capacity-varying means comprise a plunger urged towards a minimum-capacity position by a spring which also acts to hold the non-return valve open and servo means are provided to compress the said spring so as to allow the non-return valve to close and to allow the plunger to move in a capacity-increasing direction. The said servo means including a housing divided by a diaphragm or piston into two chambers one of which is maintained at a relatively lower pressure and to the other of which air is admitted at a higher pressure by a valve controlled by actuation of the sensing device. A restricted leakage path may be provided across the diaphragm or piston so that the pressures in the two chambers are equalised automatically when the supply of air at a higher pressure is cut off.

Flow restricting means may be provided to restrict flow of liquid from the pressure source to the motor cylinder and thereby prevent rapid increase in pressure in the motor cylinder when the non-return valve opens.

The flow restriction may be provided by positioning the seat of the non-return valve in a passage into which the valve closure member moves as it approaches its closed position, the relative dimensions of the passage and the valve closure member being such that when the closure member is in the passage, flow of liquid is restricted.

The invention is hereinafter described with reference to the accompanying drawings, in which:

FIGURE 1 is a general view showing, by way of example, the layout of one form of liquid pressure braking system according to the invention;

FIGURE 2 is an enlarged sectional view of the sensing device and servo-motor unit shown in FIGURE 1, the parts being in the positions they take up when the sensing device is not subjected to deceleration at a sufficient rate to cause it to respond thereto;

FIGURE 3 is a view similar to FIGURE 2 but with the parts in the positions they take up to reduce the braking;

FIGURE 4 is a section on the line 4—4 of FIGURE 2;

FIGURE 5 is a sectional elevation of an alternative form of servo-motor unit;

FIGURE 6 shows an electric switch operated by the sensing device instead of a valve;

FIGURE 7 shows one arrangement for restricting the flow of liquid past the non-return valve;

FIGURE 8 shows an arrangement which may be used in place of that shown in FIGURE 7; and FIGURE 9 is a view similar to FIGURES 2 and 3 showing a modification of the servo-motor and of the valve operated by the sensing device.

Referring first to FIGURE 1, the rear wheel brakes of a vehicle are shown diagrammatically at 10, liquid pressure motor cylinders 11 for operating the said brakes being connected by a conduit system to a master cylinder 12 operated by a pedal 13, and also connected by a conduit 14 to front wheel brake motor cylinders (not shown). A valve unit 15, hereinafter described, is interposed in the conduit system, and a servo-motor 16 controlling the said valve is itself controlled by a sensing device 17 driven by a belt 18 from the transmission shaft 19 of the vehicle. The servo-motor 16 is connected to a vacuum reservoir 21 evacuated by means (not shown) such as the suction in the inlet manifold of the vehicle engine, and receives atmospheric air through a valve 22 associated with the sensing device 17 and through an inlet filter 23.

The valve unit 15 includes a body 24 formed with a stepped bore 25 the larger end 26 of which is screw-threaded. In the said larger end 26 of the bore is fitted an apertured disc 27 providing a seat for a valve ball 28, the disc 27 being held in position against a shoulder 29 in the bore 25 by a tubular plug 31 defining a cavity in which the valve ball 28 is mounted. A spring 32 urges the valve ball towards its seat to close the aperture in the disc 27. The master cylinder 12 is connected to the tubular plug 31, and a passage 33 in the valve body, leading into the smaller part of the bore 25 adjacent the shoulder 29, is connected to the brake motor cylinders 11.

A plunger 34 slidable in the bore 25 is reduced in diameter at one end to provide a pin 35 passing with substantial clearance through the aperture in the disc 27, the pin being of such a length that it can unseat the ball 28 without its full-diameter portion obstructing the passage 33. A casing 36 forming the body of the servo-motor 16 is fixed to the valve body 24, the casing 36 comprising two parts 36a and 36b between which is clamped the edge of an annular flexible diaphragm 37 dividing the interior of the casing into two chambers 38 and 39. The inner periphery of the diaphragm 37 is clamped between a flange 41 on a cup-shaped member 42, and a disc 43, the cup-shaped member 42 being apertured at its end 44 to enable it to fit over the valve body 24. A second cup-shaped member 45, slidable on the valve body, engages the end of the plunger 34, and a coiled compression spring 46 acting on a flange 47 on said second cup-shaped member urges that member, the diaphragm 37, and the plunger 34 towards the positions in which they are shown in FIGURE 2.

The chamber 39 of the servo-motor 16 is connected at 48 to the vacuum reservoir 21, and the chamber 38 is connected to the valve 22 through a conduit 49. A small orifice 51 in the cup-shaped member 42 connects the chambers 38, 39 one to the other.

The valve 22 comprises a closure member 52 urged by a coiled compression spring 53 against a seat 54 to isolate the conduit 49 from a conduit 55 leading to the air inlet at 23.

The sensing device 17 is operated by wheel deceleration and comprises a belt pulley 56 and casing 57 fixed together and rotatable about the body of the valve 22, a flywheel 58 rotatable on a sleeve 59 which is itself in turn rotatable on a stub axle 61 fixed in the casing 57, and a slipping clutch device 62 for transmitting rotation from the pulley 56 to the flywheel 58 through the sleeve 59 and from the flywheel 58 to the sleeve 59. The unit 17 also includes a cam plate 63 moved axially by relative rotational movement of the flywheel 58 and pulley 56 to displace a push-rod 64 acting on the closure member 52 of the valve 22. A spring 60 acts on the push-rod to oppose its movement to unseat the closure member 52.

The slipping clutch device 62, as shown in FIGURE 4, comprises a resilient metal strip 65 anchored to an enlargement 66 of the sleeve 59 and engaging the peripheral wall of a recess in the flywheel, the strip being wrapped round the enlargement 66. Thus, rotation of the sleeve 59 in an anti-clockwise direction as shown in FIGURE 4 tends to unwind the strip 65 and increase its frictional grip on the flywheel, so that the latter can be set in rotation by the sleeve without any great degree of slip, whereas, if the rotation of the sleeve is slowed down, the flywheel is able to overrun it without any great degree of drag, because the strip 65 is tending to wind up and so is able to slide fairly freely on the wall of the recess.

The cam plate 63 has substantially V-shaped depressions in one surface in which engage balls 67 (FIGURES 2 and 3) located on the end face of the sleeve, the depressions being so oriented that the balls ride up their inclined surfaces during relative rotation of the sleeve 59 and the cam plate. A ball 68 provides a thrust bearing to support the reaction thrust on the sleeve 59, and a pin 69 projecting from the face of the pulley 56 into a notch 71 in the cam plate holds the cam plate against rotation relative to the pulley.

The braking system described in the preceding paragraphs operates in the following manner.

When the vehicle is being driven and the brakes are not applied, or when only a light brake application is made, the flywheel 58 is driven at the same speed of revolution as the pulley 56 and casing 57, the cam plate 63 being driven by the pin 69 and driving the sleeve 59 through the cam balls 67, the sleeve in turn driving the flywheel 58 through the strip 65.

FIGURE 2 shows the sensing device 17 and valve 22 in the positions they take up under the above-described conditions, and also shows that, under such conditions, the servo-motor diaphragm unit 37, 42, 43 is held by the spring 46 in such a position that the pin 35 on the plunger 34 holds the ball 28 of the valve 15 off its seat, thus allowing free communication between the master cylinder 12 and the motor cylinders 11. Suction is continuously applied to the chamber 39 of the servo-motor 16, the orifice 51 causing the said suction also to be applied to the chamber 38, so that the absolute pressures in the two chambers are equal.

If the brakes are applied strongly so as to cause rapid deceleration of the wheels, the pulley 56 and casing 57 are also rapidly decelerated and the flywheel tends to overrun the said pulley and casing, applying rotational drag to the sleeve 59.

If the drag applied to the sleeve 59 is sufficient, the said sleeve rotates through a small angle, causing the balls 67 to ride up the cam faces on the cam plate 63 and displace the said plate 63 axially, moving the push rod 64 against the resistance of the spring 60 to unseat the valve closure member 52, as shown in FIGURE 3. Atmospheric air is thus admitted through the valve 22 to the chamber 38 of the servo-motor, the rate of admission of air being greater than the rate at which air can escape from the chamber 38 through the orifice 51, and air pressure is built up in the chamber 38 to move the servo-motor diaphragm unit 37, 42, 43 towards the position shown in FIGURE 3. The pin 35 is thus withdrawn from the aperture in the valve seat disc 27, allowing the valve ball 28 to seat, and the plunger 34, being withdrawn along the bore 25 from the seat disc, causes the volume of the part of the liquid pressure system between the said seat disc and the motor cylinders 11 to increase.

The pressure acting to apply the rear wheel brakes 10 is thus reduced and the wheels tend to speed up until the speed of the pulley 56 and casing 57 again corresponds to that of the flywheel 58, and the valve 22 is thus allowed to close. The pressures in the two servo-motor chambers then become equalised, the pressure in the rear brake motor cylinders is restored, and the valve ball 28 is unseated.

Thus, if strong braking is maintained, the brakes 10 on the rear wheels are alternately applied and released, the release taking place, due to suitable calibration of the system, before the wheels are locked and commence to skid.

The servo-motor 16 instead of being constructed as shown in FIGURES 2 and 3, with a diaphragm unit dividing the casing into two chambers, may, as shown in FIGURE 5 comprise a piston 72 slidable in a cylinder 73, and urged by a spring 74 in a direction to cause a pin 76 formed on the end of a plunger 77 to unseat a valve ball 78 constituting the closure member of the valve unit 15. The space 79 on one side of the servo-motor piston 72 is connected at 81 to the source of suction, and the space 82 on the other side of said piston is connected at 83 to a conduit leading from the valve 22 controlled by the sensing device 17. The operation of this form of servo-motor will be obvious from the preceding description.

The sensing device 17, instead of directly actuating a valve 22 controlling the supply of air to the servo-motor may, as shown in FIGURE 6, control an electric switch 84 of the snap action type (conveniently a so-called "micro-switch") the said switch controlling an electric circuit including a solenoid to operate a separate air valve performing the same function as the valve 22. It is believed that illustration of such an electric circuit and air valve is unnecessary, since their form and arrangement would be obvious to any person skilled in the art. The operating plunger of the switch 84 is acted upon directly by the push rod 64 of the sensing device.

If, after the valve 15 has closed, the pressure in the master cylinder 12 is increased and maintained at the increased value, it is evident that there will be a substantial pressure difference across the valve 15 just before it re-opens, and when it does re-open there will, if the liquid can flow freely past the valve 15, be a sudden increase of pressure in the rear brake motor cylinders 11 resulting in rapid and strong re-application of the brakes and so causing excessively large and rapid fluctuations of braking which cause discomfort to occupants of the vehicle and increase the distance travelled by the vehicle before it is stopped by the brakes.

To avoid this rapid increase in pressure in the rear brake motor cylinders 11 it is desirable to restrict the rate of flow of liquid through the valve 15, and two arrangements for so restricting the flow are shown in FIGURES 7 and 8 respectively.

In FIGURE 7 the disc 27 which forms the valve seat in FIGURES 2 and 3 is replaced by a tubular plug 85 the bore of which is stepped at 86 to provide a valve seat, the portion 87 of the bore above the step 86 being of a diameter not substantially greater than that of the ball 28, so that the said ball, when unseated but within the bore portion 87, causes flow of liquid through the valve 15 to be restricted.

Alternatively, as shown in FIGURE 8, the ball 28 may co-operate with a seating disc 27 as described with reference to FIGURES 2 and 3, and a flow restriction may be provided by a drilled plug 88 fitted in the bore of a banjo bolt 89 securing to the plug 31 a banjo fitting 91 by means of which the conduit leading from the master cylinder 12 is connected to the valve 15.

Referring to FIGURE 9, the valve unit 15 and servomotor 16 are the same as those shown in FIGURES 2 and 3, except that the aperture 51 permitting restricted flow between the chambers 38 and 39 is omitted, these chambers being permanently separated. The valve 22 is modified by the addition of a tubular fitting 92 the inner end of which provides an alternative seat 93 for a closure member 94 replacing the closure member 52, whilst its outer end is connected to the source of suction. Thus, under normal conditions the chamber 38 of the servomotor, as well as the chamber 39, is connected to suction, but operation of the sensing device moves the valve closure member 94 on to the seat 93 so that the servomotor chamber 38 is cut off from the source of suction and connected to the atmosphere.

Instead of connecting the chamber 39 of the servomotor to a vacuum reservoir and connecting the chamber 38, through the valve 22 or its equivalent, to the atmosphere, the said chamber 39 may be connected to the atmosphere and the chamber 38 may be connected to a supply of compressed air through the valve 22 or its equivalent.

Instead of having a single sensing device 15 driven from the transmission shaft of the vehicle, separate sensing devices may be driven each by one wheel of the vehicle and both may control a single servo-motor or each may control, through a valve 22, a separate servomotor 16 actuating a valve 15 controlling the connection to the master cylinder of the motor cylinder actuating the brake on that wheel.

Whilst the invention has been described only with a sensing device which is responsive to wheel deceleration, it will be understood that the valve 22 or an equivalent valve performing the same function may be operated by a sensing device responsive to any condition change which would lead to skidding such as, for example, a reduction of the speed of wheel rotation relative to vehicle speed.

I claim:

1. A liquid pressure braking system of the hydrostatic type wherein there is provided a master cylinder and brake operating motor cylinder in communication with each other with a brake operated by said motor cylinder, a valve body disposed between said master cylinder and motor cylinder, the lower end of said valve body being of reduced size, a central bore means extending through said body and forming a variable capacity chamber, inlet means in communication with the upper end of said bore means and having a valve seat therein, a non-return valve disposed to seat on said valve seat, outlet means in the upper end of said valve body below said valve seat and in communication with said motor cylinder, a plunger in said bore disposed below said non-return valve, a servo motor casing comprising a substantially flat circular portion with an annular diaphragm dividing the circular portion into a low pressure chamber below said diaphragm and a high pressure chamber above said diaphragm, said diaphragm casing having an upwardly extending cup shape portion surrounding the reduced size portion of said valve body and spaced therefrom, an inner cup shaped member secured to the inner edge of said diaphragm and disposed within said cup shape portion of said casing, an inturned flange on said inner cup member abutting said reduced portion of the valve body, a slidable cup shape member within said inner cup shaped member and slidably disposed on and surrounding the outer surface of said reduced portion size of said valve body, said slidable cup member being in contact with the plunger disposed in said central bore, biasing means mounted over said slidable cup member urging said plunger upwardly in said central bore to hold said non-return valve unseated, sensing means operable in response to deceleration of a wheel including a valve for controlling the pressure in said high pressure chamber for actuating said diaphragm and said plunger to permit said non-return valve to seat and increase the volume of said variable capacity chamber.

2. The system of claim 1 wherein a restricted orifice means is provided in said inner cup in communication with said high and low pressure chambers to equalize the pressure in said two chambers when the flow of air to the high pressure chamber is cut off.

3. The system of claim 1 wherein said non-return valve has disposed adjacent thereto flow restricting means to restrict the flow of liquid by said valve and between said master and motor cylinders.

References Cited by the Examiner

UNITED STATES PATENTS

| 2,537,347 | 1/1951 | Hieger et al. | 251—61 X |
| 2,841,387 | 7/1958 | Mortimer | 188—181 X |
| 2,953,413 | 9/1960 | Jankauskas | 303—24 |
| 3,011,831 | 12/1961 | Trevaskis | 303—24 |
| 3,020,094 | 2/1962 | Murty et al. | 303—6 X |
| 3,093,422 | 6/1963 | Packer et al. | 303—21 |
| 3,099,499 | 7/1963 | Parshall | 303—21 |

EUGENE G. BOTZ, *Primary Examiner.*